US012623859B2

(12) United States Patent (10) Patent No.: US 12,623,859 B2
De Bastiani (45) Date of Patent: May 12, 2026

(54) GROMMET MODULE

(71) Applicant: Komax Holding AG, Dierikon (CH)

(72) Inventor: Franco De Bastiani, Thalwil (CH)

(73) Assignee: KOMAX HOLDING AG, Dierikon (CH)

( * ) Notice: Subject to any disclaimer, the term of this patent is extended or adjusted under 35 U.S.C. 154(b) by 38 days.

(21) Appl. No.: 18/747,504

(22) Filed: Jun. 19, 2024

(65) Prior Publication Data

US 2024/0425297 A1 Dec. 26, 2024

(30) Foreign Application Priority Data

Jun. 26, 2023 (EP) .................................... 23181343

(51) Int. Cl.
*B65G 47/14* (2006.01)
*B65G 47/84* (2006.01)
(52) U.S. Cl.
CPC ..... *B65G 47/1478* (2013.01); *B65G 47/1407* (2013.01); *B65G 47/846* (2013.01)
(58) Field of Classification Search
CPC ............ B65G 47/1407; B65G 47/1478; B65G 47/846
USPC .......................... 198/397.01, 397.02, 397.03
See application file for complete search history.

(56) References Cited

U.S. PATENT DOCUMENTS

| | | | | | |
|---|---|---|---|---|---|
| 1,692,456 | A | * | 11/1928 | Lynch ................ | B65G 47/1478 |
| | | | | | 198/398 |
| 2,661,866 | A | * | 12/1953 | Lubbert ............. | B65G 47/1478 |
| | | | | | 221/68 |
| 3,779,422 | A | * | 12/1973 | Mori ........................ | B25B 23/04 |
| | | | | | 198/398 |
| 5,603,442 | A | * | 2/1997 | Schmidt ................. | A41H 37/00 |
| | | | | | 227/112 |
| 2006/0090984 | A1 | * | 5/2006 | Nalbach .............. | B65G 47/256 |
| | | | | | 198/397.03 |
| 2014/0059849 | A1 | * | 3/2014 | Meierhans ............ | B23P 19/084 |
| | | | | | 198/560 |

FOREIGN PATENT DOCUMENTS

| | | | | | | |
|---|---|---|---|---|---|---|
| CN | 106628964 | A | * | 5/2017 | ........ | B65G 47/8884 |
| EP | 0626738 | B1 | | 12/1997 | | |
| EP | 1251605 | A1 | | 10/2002 | | |
| EP | 1689049 | A1 | | 8/2006 | | |
| EP | 2731207 | A1 | * | 5/2014 | .......... | H01R 43/005 |
| EP | 3651288 | A1 | | 5/2020 | | |
| JP | 61027826 | A | * | 2/1986 | ........ | B65G 47/1428 |
| JP | H05299149 | A | | 11/1993 | | |

* cited by examiner

*Primary Examiner* — James R Bidwell
(74) *Attorney, Agent, or Firm* — Shumaker, Loop & Kendrick, LLP

(57) ABSTRACT

A grommet module includes a grommet container for loosely receiving grommets as bulk material, a conveyor device that can rotate about an axis of rotation, and a conveyor rail extending along a longitudinal direction. The conveyor device conveys grommets from the grommet container to the conveyor rail. The conveyor device is formed by a grommet conveyor wheel, the horizontal axis of rotation of which runs at a right angle to the longitudinal direction. The grommet conveyor wheel has trough-like recesses forming in each case a chamber for the grommets.

16 Claims, 2 Drawing Sheets

GROMMET MODULE

FIELD

The invention relates to a grommet module or grommet station for fitting cables with grommets, which grommets are required for example for moisture-tight feedthroughs of electrical cables through connector housings or housing walls of electrical appliances, that can be applied to cables in an economical manner.

BACKGROUND

Grommets are sealing elements made of silicone, for example, which are generally used to seal connector housings. In the production of cables, cable may be cut to length and stripped, fitted with grommets, crimped, and optionally provided with housings. For this purpose, a stripped cable is fitted with a grommet, and then, usually, a metal contact is crimped. This crimp contact is designed so that it fastens the grommet on the cable. The grommet fitting is carried out on fully automatic cable assembly systems with grommet fitting stations, wherein the grommets usually are added to the grommet fitting station as bulk material. Semi-automatic machines for cable assembly systems are also known (here, the cable is inserted by hand), which can carry out the fitting of grommets in addition to other operations. For fully automatic machines in particular, it is advantageous if the conversion of the grommet station can be effected from one grommet variant to another rapidly and without error.

A comparable grommet module of this type is shown in EP 1 689 049 A1. The grommet module forms a grommet station comprising a grommet storage unit with a drum filled with grommets and a grommet fitting device for fitting a stripped cable end of a cable with a grommet. The grommet storage unit is part of a grommet supply device for supplying grommets for fitting, which grommet fitting device further comprises a conveyor rail of a vibratory conveyor. A sorting and buffering of the grommets is effected with the conveyor rail. At the end of the buffer section, the grommet fitting device removes a single grommet to fit it onto the cable. By means of a conveyor rail, the grommets are conveyed in the correct position to a separating unit, from which the grommets are pushed in each case individually onto a mandrel of a rotating transfer unit comprising four mandrels. In addition to the referenced transfer unit with the four mandrels, the grommet fitting device further comprises a fitting head with an expansion sleeve and a grommet receiving part. At the upper end of the separating unit, an ejection device is arranged with a tappet which can be moved up and down, wherein the tappet in each case feeds the first grommet in the conveyor rail to the transfer device. The transfer device is successively pivotable around a 90° angle, wherein, in a first position, the grommet is pushed onto the mandrel by means of the tappet. After a rotation around 90°, the grommet is pushed in a second position of the transfer unit for the purpose of expansion onto an area of the mandrel with a larger diameter. The actual fitting of the grommet onto the cable end takes place in a third position. In this third position of the transfer device, the grommet is removed from the mandrel using the fitting head, the grommet is pushed onto the expanding sleeve, the grommet is placed on the cable in its expanded state, and finally pushed thereon. Once the mandrel has been pivoted to the third position, the fitting head encloses the grommet with the two-part expanding sleeve and the grommet receiving part, which is formed by two parts as well. The drum has blades on the inside that, upon the rotation of the drum, convey the grommets upwards so that they fall onto the conveyor rails in a disorderly manner. Although grommet modules with drums have proven their worth, they are characterized by a comparatively large space requirement and, in particular, a wide design.

SUMMARY

It is an object of the present invention to create an improved grommet module which is characterized by a small space requirement and in particular enables a narrow design.

This and other objects are achieved according to the invention with a grommet module with the features described herein.

The grommet module comprises a grommet container for loosely receiving or storing grommets as bulk material, a conveyor device that can rotate about an axis of rotation, and a conveyor rail extending along a longitudinal direction. By means of the conveyor device, grommets from the grommet container can be conveyed to the conveyor rail. The conveyor rail for conveying grommets in the correct position to a grommet fitting device can be a known vibratory conveyor or can be associated with such a vibratory conveyor. Because the conveyor device is formed by a grommet conveyor wheel, the axis of rotation of which preferably runs transversely and particularly preferably at a right angle to the longitudinal direction, a compact grommet module can be created, which is characterized by small dimensions, particularly in terms of width, or is narrow. The grommet conveyor wheel, which can be rotated by means of a drive, can preferably be connected to the stationary grommet container or integrated into it. A further advantage of the grommet conveyor wheel is that it is easy to set up, inexpensive, and can be operated reliably.

The grommet conveyor wheel can be rotatable about a horizontal axis of rotation, as a result of which, by means of the grommet conveyor wheel, vertical conveyance results. Therefore, the entry of grommets in relation to the grommet feed wheel is at the bottom; the discharge of grommets is at the top. The entry can be located at or near the base of the grommet container. The grommets reach the conveyor rail via the discharge.

The grommet module can be a component of a grommet station for fitting cables. The grommet station can have a grommet fitting device for fitting cable ends of cables with grommets. Furthermore, the grommet station can have a grommet supply device for supplying grommets for fitting with the grommet fitting device. The previously referenced components of the grommet module, i.e., the grommet container, the grommet conveyor wheel, and the conveyor rail of the vibratory conveyor, would be assigned to the aforementioned grommet supply device. Fitting tools can be mounted on the grommet fitting device, including, for example, a transfer unit with a mandrel or possibly with a plurality of mandrels, onto which the grommets can be slid. It is also conceivable for the grommet module or the grommet station with the grommet module to be a component of a cable assembly system. Thus, the grommet module or grommet station described here does not necessarily have to be designed as a stand-alone cable processing machine.

The grommet conveyor wheel can be a substantially disk-shaped or ring-shaped component with a circular contour. The grommet conveyor wheel can be designed as a single piece. It can be made of a hard or rigid material—for example, aluminum, steel, or a hard plastic.

According to a first embodiment, the grommet conveyor wheel can have a ring-shaped base body, on which base body a plurality of conveyor receptacles or chambers for grommets are arranged-preferably evenly distributed on the ring. The grommet conveyor wheel can have a plurality of conveyor receptacles for grommets. Conveyor receptacles can, for example, be designed in the shape of blades.

The grommet conveyor wheel can have at least one trough-like recess, preferably at least three trough-like recesses, and particularly preferably at least three trough-like recesses as conveyor receptacles for forming in each case a chamber for grommets.

A particularly compact and narrowly constructed grommet module can be created if the grommet conveyor wheel of the grommet module is a grommet conveyor wheel that can rotate about a horizontal axis of rotation and if the at least one recess is open towards a horizontal side running coaxially to the axis of rotation. In other words, these recesses are arranged on a flat ring flange side, which lies on a plane whose surface normal is coaxial to the axis of rotation of the grommet conveyor wheel. The conveyor rail can be arranged horizontally, but preferably transversely and particularly preferably at a right angle to the axis of rotation of the grommet conveyor wheel in the grommet module.

Preferably, the respective recess can have a rear-side end wall section formed by a preferably radial separating bar, preferably running in the axial direction predefined by the axis of rotation, over which the grommets can be carried along during rotation or conveyed by pushing.

The respective recess can further have a boundary section that adjoins the end wall section and that can form the trough base.

The respective recess can have an outer cylindrical side wall section extending in the axial direction.

Thus, the respective recess can have a rear-side end wall section, a boundary section forming the trough base or adjoining the front side of the trough base, and an outer cylindrical side wall section.

The terms used here, such as front or front-side, on the one hand, and back or rear-side, are to be understood in relation to the direction of rotation of the grommet conveyor wheel.

It can be particularly advantageous if the respective recess has a boundary section, which boundary section has a boundary surface, i.e., the surface of the boundary section, curved such that it is designed to taper in terms of depth from the rear-side end, which is predefined by the end wall section, towards the front-side end with respect to the recess. In this way, reliable and trouble-free operation can be ensured. This shape can prevent unwanted jamming of grommets when the grommet feed wheel is rotating.

Preferably, the boundary section has a conical, concave surface, as a result of which it is particularly easy to ensure a reliable and trouble-free operation of the grommet module.

The grommet container can comprise a container base and a grommet container side wall that is, for example, approximately vertical and preferably substantially flat. In this case, the grommet conveyor wheel can be arranged on a side, opposite this grommet container side wall, of the grommet container. This grommet container side wall can preferably run parallel to the longitudinal direction.

The grommet container can further have an inclined container wall. Thanks to the inclined grommet container wall, it is possible to prevent grommets from remaining on the container wall in an undesirable manner and accumulating downwards towards the container base. The inclined grommet container wall can be a wall that connects the container side wall previously referenced running vertically and/or parallel to the longitudinal direction with the opposite side, assigned to the grommet conveyor wheel, of the grommet container.

The grommet container can have a round container base adapted to the grommet conveyor wheel.

It can also be advantageous if the grommet container is open at the top for forming a filler opening. Thanks to this arrangement, grommets can easily be refilled even during ongoing operation.

The grommet module can comprise a drive for rotating the grommet conveyor wheel. For example, the grommet conveyor wheel can be provided with external teeth on the circumference. For rotating the grommet conveyor wheel, a pinion that can be driven by a drive can be operatively connected to the external toothing. Instead of external toothing, internal toothing or another coupling with a drive is conceivable. Alternatively, the grommet conveyor wheel could be rigidly connected to an axle, and this axle could be connected to a drive, such as a synchronous motor, via a gearbox or even without a gearbox.

The grommet module can comprise a ramp adjoining the grommet conveyor wheel but not connected to it, via which ramp the grommets at the discharge of the grommet conveyor wheel are guided in the direction of the conveyor rail. The ramp can be positioned above the conveyor rail and terminate such that the grommets fall down onto it or land on it without a step.

DESCRIPTION OF THE DRAWINGS

Further individual features and advantages of the invention arise from the following description of an exemplary embodiment and from the drawings. Shown are.

DETAILED DESCRIPTION

Figure 1:
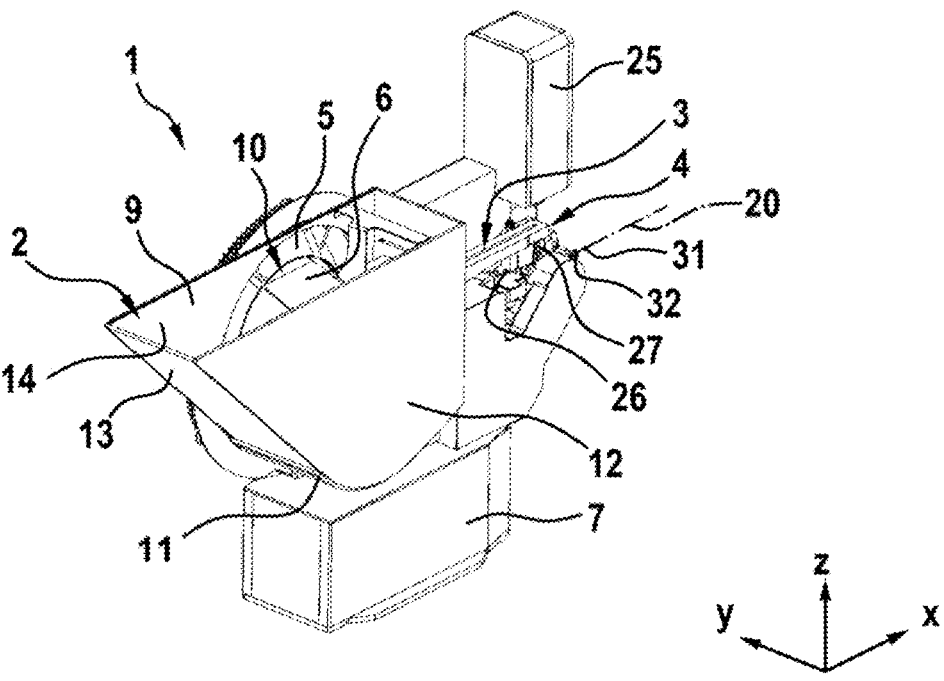
FIG. 1 is a perspective representation of a grommet module.

FIG. 1 shows a grommet module 1 with a stationary grommet container 2 for loose reception or stockpiling of grommets as bulk material. The grommet module 1 further has a known vibratory conveyor with a conveyor rail designated 3 extending along a longitudinal direction 20 for conveying grommets in the correct position to a grommet fitting device 4. By means of a conveyor device described in detail below, grommets (not shown) are conveyed from the grommet container 2 to the conveyor rail 3. The referenced conveyor system is formed by a grommet conveyor wheel 10. The grommet conveyor wheel 10, which can rotate about a horizontal axis of rotation 30 (FIG. 2), is arranged on one side of the grommet container 2. As can be seen, the axis of rotation 30 extends in a direction at a right angle to the longitudinal direction 20. The Cartesian coordinate system shown in FIGS. 1 and 2 with the axes x-y-z serves as an aid for understanding the directions. The longitudinal direction 20 runs in the x-direction, and the axis of rotation 30 runs in the y-direction.

In the present case, the grommet module 1 further comprises the grommet fitting device 4 for fitting cable ends of cables 31 with grommets 32. The components grommet container 2 referenced above, grommet conveyor wheel 10, and conveyor rail 3 are assigned to a grommet supply device for supplying grommets for fitting with the grommet fitting device 4. Thus, the grommet module 1 shown in FIG. 1 can also be described as a grommet station for fitting cables. The grommet station with a grommet supply device and a grommet fitting device 4 further has a support structure 7 for supporting the grommet fitting device 4 and the grommet supply device comprising the grommet container 2, the grommet conveyor wheel 10, and the conveyor rail 3. In the present case, the grommet fitting device and the grommet supply device are, by way of example, firmly connected to one another. The two devices form a common grommet module 1, which is connected to the support structure 7. The grommet module 1 could also be designed such that it can be coupled to and uncoupled from the support structure 7. It is further conceivable that grommet container 2, the grommet conveyor wheel 10 and the conveyor rail 3 be assigned to a grommet module, which is designed as an independent unit that can be coupled to and uncoupled from a separate grommet fitting device. Finally, the grommet module 1 or the grommet station could be part of a cable assembly system (not shown). The cable assembly system for assembling cables, which is designed as a pivoting machine, for example, can have a feed unit with a directional arrangement, such as cable conveyors designed as belt conveyors, which bring the cables to a pivoting unit. The pivoting unit has a gripper for retaining the cable. A stripping station for cutting and stripping the cable can be arranged on the longitudinal axis of the machine. Crimping stations and grommet stations, in the same way as grommet module 1, can be arranged next to the longitudinal axis of the machine. Such cable assembly systems are described, for example, in EP 1 251 605 A1, wherein the present cable assembly system has the novel grommet module 1. The compact and, in particular, narrow design of the grommet module 1 makes it possible to provide the cable assembly system with even more grommet modules 1 compared to conventional cable assembly systems, as a result of which the variability of the cable assembly system is further increased.

In an advantageous embodiment variant, the grommet conveyor wheel 10, the grommet container 2, and the conveyor rail 3 together with an actuator for generating the vibrations for the linear conveyance of the grommets in the conveyor rail can form a unit that can be replaced as a whole, in order to rapidly convert the grommet module 1 to another grommet.

The grommet container 2 has a container base 11 and a vertical and substantially flat grommet container side wall 12. As can be seen, the container side wall 12 designated 12 is oriented parallel to the longitudinal direction 20 predefined by the conveyor rail 3. The grommet conveyor wheel 10 is arranged on the side, opposite the container side wall 12 which runs parallel to the longitudinal direction, of the grommet container. On this side, the grommet container 2 has a container side wall 14 with a circular opening for the grommet conveyor wheel 10. Between the two container side walls 12 and 14, which are approximately plane-parallel to one another, there is an inclined container wall 13, which connects the walls 12, 14 with one another.

Figure 2:
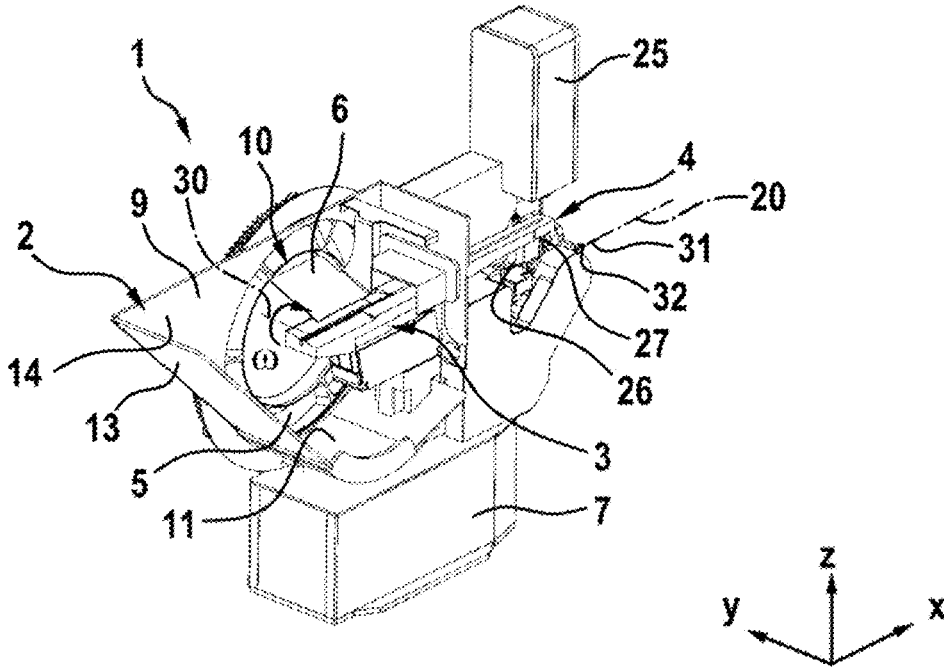
FIG. 2 shows the grommet module according to FIG. 1, but with the container side wall removed.

FIG. 2 shows the grommet module 1 with the container side wall 12 removed or made invisible for a better understanding of the structure and mode of operation. This shows, for example, that the container base 11 is adapted to the grommet conveyor wheel 10 and is designed to be round.

The grommet conveyor wheel 10 has trough-like recesses 5 for forming chambers for grommets. The recesses 5 are open on the horizontal side towards the interior of the grommet container. The entry of grommets into the grommet conveyor wheel 10, which rotates in the direction of rotation w during operation, is at the bottom in the region of the round container base 11, and the discharge of grommets is at the top. A ramp 6 is located at the grommet discharge, via which ramp the grommets are guided to the conveyor rail 3.

A separating unit 25 is arranged at the end of the conveyor rail 3. By means of the conveyor rail 3, the grommets are conveyed in the correct position to the separating unit 25, from which in each case individual grommets are pushed onto a mandrel of a transfer unit 26. The separating unit 25 and the transfer unit 26 with the mandrel are components of the grommet fitting device 4, which further comprises a loading head 27. For example, the grommet fitting device 4 could be a grommet fitting device as shown and described in EP 3 651 288 A1. The grommet fitting device of the grommet station could also have a plurality of mandrels, such as the grommet fitting device with the four mandrels known from EP 0 626 738 B1. The exact design and mode of operation of grommet fitting devices can be found in the mentioned publications, to which reference is made.

The grommet container 2 serves as a storage unit for the loose grommets to be processed and is designed such that the grommets falling or blown out of the conveyor rail 3 during the sorting process and also the grommets falling next to the conveyor rail can be received. The grommet container 2 is designed such that the grommets are guided by gravity in the direction of the deepest chamber upon the entry of the grommets. The ramp 6 arranged above the conveyor rail 3 serves to guide the grommets falling from the chambers of the grommet conveyor wheel 10 onto the front end of the conveyor rail 3 in an ideal manner. The grommet container 2 can have further internal contours (not shown), in order to guide the grommets or divide the interior.

The grommet container 2 is designed to be open at the top for forming a filler opening 9 for filling or refilling grommets. Of course, it would also be conceivable to equip the grommet container 2 with a lid in order to close the filler opening 9.

Figure 3:
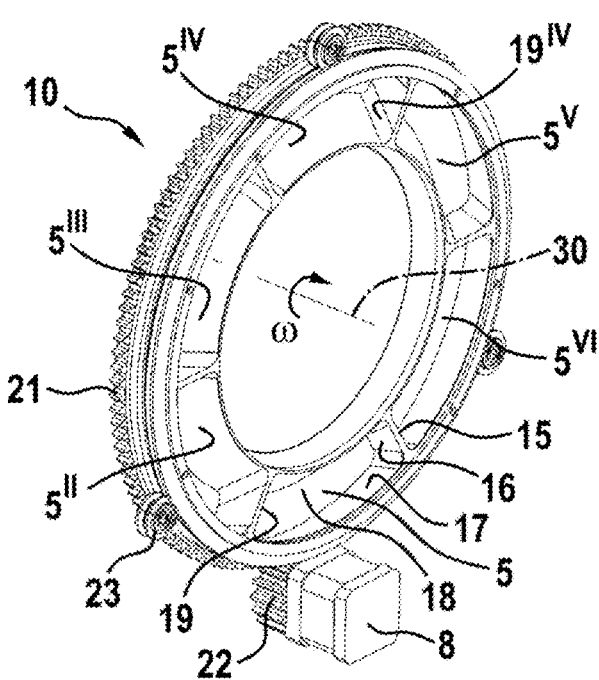
FIG. 3 shows a grommet conveyor wheel of the grommet module according to FIG. 1.
Figure 4:
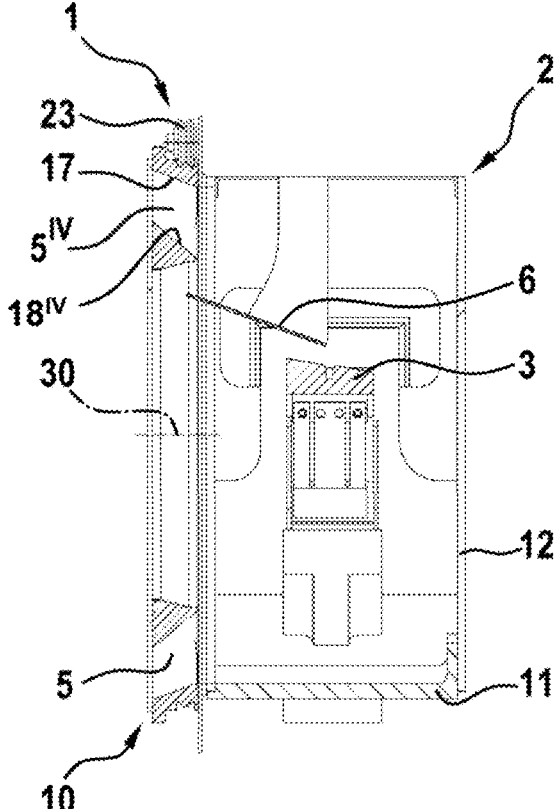
FIG. 4 is a cross-sectional representation of the grommet module with the grommet conveyor wheel.

Design details of the grommet module 1 can be taken from FIGS. 3 and 4. FIG. 3 shows approximately how the grommet conveyor wheel 10 is driven. The grommet module 1 comprises a drive 8 for rotating the grommet conveyor wheel. This can be an electric motor, for example. The grommet conveyor wheel 10 is provided with an external toothing 21 on the circumference. For rotating the grommet conveyor wheel 10, a pinion 22 that can be driven via the drive 8 is in operative connection with the external toothing 21. Alternatively, a friction wheel drive would also be possible, for example. Bearing rollers 23 are provided to support and guide the grommet conveyor wheel 10 during the rotary movement.

The grommet conveyor wheel 10 is designed as a single piece and is made of a hard or rigid material (for example, aluminum, steel, or a hard plastic). In the present case, the grommet conveyor wheel 10 is a ring-shaped component with a circular contour when viewed in the direction of the axis of rotation 30. On the ring-shaped base body of the grommet conveyor wheel 10, by way of example, six trough-like recesses 5 are arranged as chambers for grommets, which are evenly distributed on the ring. These recesses 5 are arranged on a flat ring flange side of the grommet conveyor wheel 10, which lies on a plane whose surface normal is coaxial to the axis of rotation 30. These six recesses all have the same design and are designated 5, 5$^{II}$, 5$^{III}$, 5$^{IV}$, 5$^{V}$, 5$^{VI}$.

The respective recess 5 has a rear-side end wall section 16 formed by a radial separating bar 15 and running in the axial direction 30, via which the grommets are carried along during rotation in the direction of rotation ω. The recess 5 further has an outer cylindrical side wall section 17 extending in the axial direction. This side wall section 17 lies on a cylinder with cylinder axes running coaxially to the axis of rotation 30. The front side of the recess is designated 19, and 19$^{IV}$ in FIG. 3 based upon the recess 5$^{IV}$. The respective recess 5 then has a boundary section 18, which has a boundary surface curved such that it is designed to taper from the rear-side end towards the front-side end with respect to the depth of the recess. In the present exemplary embodiment, the boundary section 18 has a conical, concave surface, as a result of which a trouble-free operation is ensured. Thanks to the special shape of the recess with the conical boundary section 18, it can be seen from FIG. 4, for example, that grommets can easily leave the chamber again after vertical conveyance, when they are discharged via the boundary section 18$^{IV}$, which is inclined downwards. The conical surfaces of the boundary section 18 have the function of preventing the grommets from becoming trapped between the separating bars 15 and stationary parts, such as the ramp 6 in the grommet container 2.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A grommet module comprising:
a grommet container configured to loosely receive grommets as bulk material;
a conveyor device rotatable about an axis of rotation;
a conveyor rail extending along a longitudinal direction;
wherein the conveyor device conveys the grommets from the grommet container to the conveyor rail;
wherein the conveyor device includes a grommet conveyor wheel that rotates about the axis of rotation, the axis of rotation extending transversely to the longitudinal direction; and
wherein the grommet conveyor wheel has an external toothing on a circumference and including a pinion operatively connected to the external toothing, the pinion being driven by a drive.

2. The grommet module according to claim 1 wherein the axis of rotation extends at a right angle to the longitudinal direction.

3. The grommet module according to claim 1 wherein the grommet conveyor wheel has a ring-shaped base body on which a plurality of chambers adapted to receive the grommets are arranged.

4. The grommet module according to claim 3 wherein the chambers are evenly distributed on the ring.

5. The grommet module according to claim 1 wherein the grommet conveyor wheel has at least one trough-like recess forming a chamber adapted to receive the grommets.

6. The grommet module according to claim 5 wherein the grommet conveyor wheel rotate about the axis of rotation that extends in a horizontal direction and the at least one trough-like recess is open toward the horizontal direction.

7. The grommet module according to claim 5 wherein the at least one trough-like recess has a rear-side end wall section formed by a separating bar, the rear-side end wall section extending parallel to the axis of rotation.

8. The grommet module according to claim 5 wherein the at least one trough-like recess has a boundary section with a curved boundary surface, the boundary surface tapering in depth from a rear-side end towards a front-side end of the at least one trough-like recess.

9. The grommet module according to claim 8 wherein the curved boundary surface is a conical, concave surface.

10. The grommet module according to claim 1 wherein the grommet container has a grommet container side wall and the grommet conveyor wheel is arranged on a side of the grommet container opposite the grommet container side wall.

11. The grommet module according to claim 1 wherein the grommet container includes an inclined container wall.

12. The grommet module according to claim 1 wherein the grommet container includes a round container base adapted to a shape of the grommet conveyor wheel.

13. The grommet module according to claim 1 wherein the grommet container is open at the top forming a filler opening for receiving the grommets.

14. The grommet module according to claim 1 including a ramp adjoining the grommet conveyor wheel, the ramp adapted to guide the grommets at a discharge of the grommet conveyor wheel to the conveyor rail.

15. A grommet module comprising:
a grommet container configured to loosely receive grommets as bulk material;
a conveyor device rotatable about an axis of rotation;
a conveyor rail extending along a longitudinal direction;
wherein the conveyor device conveys the grommets from the grommet container to the conveyor rail;
wherein the conveyor device includes a grommet conveyor wheel that rotates about the axis of rotation, the axis of rotation extending transversely to the longitudinal direction; and
wherein the grommet conveyor wheel has at least one trough-like recess forming a chamber adapted to receive the grommets, where the at least one trough-like recess has a rear-side end wall section formed by a separating bar, the rear-side end wall section extending parallel to the axis of rotation.

16. A grommet module comprising:
a grommet container configured to loosely receive grommets as bulk material;
a conveyor device rotatable about an axis of rotation;
a conveyor rail extending along a longitudinal direction;
wherein the conveyor device conveys the grommets from the grommet container to the conveyor rail;
wherein the conveyor device includes a grommet conveyor wheel that rotates about the axis of rotation, the axis of rotation extending transversely to the longitudinal direction; and
wherein the grommet conveyor wheel has at least one trough-like recess forming a chamber adapted to receive the grommets, where the at least one trough-like recess has a boundary section with a curved boundary surface, the boundary surface tapering in depth from a rear-side end towards a front-side end of the at least one trough-like recess.

* * * * *